United States Patent
Ishii et al.

(10) Patent No.: US 8,126,621 B2
(45) Date of Patent: Feb. 28, 2012

(54) ENGINE LOAD CONTROL DEVICE OF WORK VEHICLE

(75) Inventors: Shotaro Ishii, Sagamihara (JP); Akira Fukushima, Mooka (JP)

(73) Assignee: Komatsu Ltd., Tokyo (JP)

( * ) Notice: Subject to any disclaimer, the term of this patent is extended or adjusted under 35 U.S.C. 154(b) by 407 days.

(21) Appl. No.: 12/444,776

(22) PCT Filed: Oct. 24, 2007

(86) PCT No.: PCT/JP2007/070728
§ 371 (c)(1),
(2), (4) Date: Apr. 8, 2009

(87) PCT Pub. No.: WO2008/072422
PCT Pub. Date: Jun. 19, 2008

(65) Prior Publication Data
US 2010/0070146 A1    Mar. 18, 2010

(30) Foreign Application Priority Data
Dec. 15, 2006  (JP) ................... 2006-338741

(51) Int. Cl.
*G06F 21/00* (2006.01)

(52) U.S. Cl. ............... 701/50; 701/51; 474/28; 474/18; 477/115; 477/68; 477/154

(58) Field of Classification Search ............ 60/452, 60/490, 428; 701/50, 51; 91/459, 517; 477/115, 477/68, 154; 474/28, 18; 475/123
See application file for complete search history.

(56) References Cited

U.S. PATENT DOCUMENTS

| | | | | |
|---|---|---|---|---|
| 5,307,631 A | * | 5/1994 | Tatsumi et al. | 60/452 |
| 2007/0068152 A1 | * | 3/2007 | Nishi et al. | 60/490 |
| 2007/0193262 A1 | | 8/2007 | Iwamoto | |

FOREIGN PATENT DOCUMENTS

| | | |
|---|---|---|
| JP | 03-210082 A | 9/1991 |
| JP | 11-182443 A | 7/1999 |
| JP | 2004-108155 A | 4/2004 |
| JP | 2006-052673 A | 2/2006 |
| JP | 2006-070877 A | 3/2006 |

* cited by examiner

*Primary Examiner* — Behrang Badii
(74) *Attorney, Agent, or Firm* — Global IP Counselors

(57) ABSTRACT

In an engine load control device of a work vehicle, an output of an engine is transmitted to a hydraulic actuator via a variable displacement type hydraulic pump. A controller is configured to calculate, based on a target rotational speed of the engine detected by a target rotational speed detecting portion and an actual rotational speed of the engine detected by an actual rotational speed detecting portion, a variation rate per unit time of a difference between the detected results, and to adjust the maximum absorbing torque of the hydraulic pump according to the magnitude of the variation rate.

10 Claims, 12 Drawing Sheets

ST Pump: Relation among Ne2 - No2, Max Absorbing Torque, and α

(a)

ST Pump · Assigned PC-EPC Current Value relative to Ne2 - No2 Depending on different α

|  |  | α=0 | | α=1.5 | |
|---|---|---|---|---|---|
| Ne2−No2 | (rpm) | 600 | 1500 | 900 | 1500 |
| Max Absorbing Torque | (%) | 100 | 70 | 100 | 80 |
| Assigned PC-EPC Current | (mA) | 0 | 240 | 0 | 160 |

(b)

(a)

(b)

ENGINE LOAD CONTROL DEVICE OF WORK VEHICLE

CROSS-REFERENCE TO RELATED APPLICATIONS

This U.S. National stage application claims priority to Japanese Patent Application No. 2006-338741, filed in Japan on Dec. 15, 2006. The entire disclosure of Japanese Patent Application No. 2006-338741 is hereby incorporated herein by reference.

TECHNICAL FIELD

The present invention relates to an engine load control device of a work vehicle in which the output of an engine is transmitted to driving wheels and is transmitted via a plurality of variable displacement type hydraulic pumps to a plurality of hydraulic actuators including a hydraulic actuator for a working unit.

BACKGROUND ART

Generally, in work vehicles such as a wheel loader, an engine serves as a driving source for vehicle running and a driving source for a working unit. That is, the output of the engine that is transmitted to driving wheels via a torque converter allows a vehicle to run. In addition, the engine drives various types of hydraulic pumps including a hydraulic pump for the working unit, and these hydraulic pumps drive various types of devices such as the working unit via hydraulic actuators. Specifically, when the engine drives a steering hydraulic pump, pressure oil that is discharged from the steering hydraulic pump is provided to a steering hydraulic cylinder so that a steering mechanism can be driven, for example. Also, when the engine drives a loader hydraulic pump, pressure oil that is discharged from the loader hydraulic pump is provided to a loading hydraulic cylinder so that a loading device can be driven.

Thus, in wheel loaders, the output of one engine is used both for the vehicle running and the driving of various devices such as the working unit. Accordingly, the magnitude of engine output that is used for the vehicle running will vary according to the magnitude of a load that is applied to the working unit and the like.

For example, in the case where the rotational speed of the engine is in a low idle rotational speed range (idling state), as compared with the case where the rotational speed of the engine is in a high rotational speed range, rise of engine torque slowly responds to rise of a hydraulic load. For this reason, if an operator operates the loading device to raise the loading device carrying a load while operating a steering wheel which in turn applies a sharply-increased hydraulic load, the torque rise of the engine cannot respond to the sharply-increased hydraulic load, and the engine may stall.

Also, in the case where the loading device and the steering mechanism are activated during vehicle running, since engine output is consumed for hydraulic loads for the working unit and the steering mechanism, output that can be used for the vehicle running load is limited to the rest of engine output. For this reason, the response to accelerator operation by an operator gets worse, for example, sufficient pulling force may not be provided, or it may take time to raise the vehicle speed.

For example, Japanese Patent Laid-Open Publication No. 2004-108155 (published on Apr. 8, 2004) discloses a pump torque control device of a hydraulic construction machine that, during speed sensing control in which the maximum absorbing torque of a hydraulic pump is controlled based on the deviation between a target rotational speed and an actual rotational speed, if an engine has sufficient output, the output of the engine can be effectively utilized.

SUMMARY OF THE INVENTION

However, the aforementioned known pump torque control device has the following problem.

That is, although the pump torque control device disclosed in the foregoing document controls the maximum absorbing torque of a pump according to the deviation between the target and actual rotational speeds, the pump torque control device cannot recognize the tendency of the variation of the deviation between the target and actual rotational speeds. For this reason, for example, in the case of the same magnitude of the deviation, it cannot be determined whether the deviation is increasing, decreasing or stable. As a result, it cannot be the that the control simply based on only the deviation between the target and actual rotational speeds enable the state of an engine load to be accurately recognized to effectively control the engine load.

It is an object to provide an engine load control device of a work vehicle wherein an engine load (absorbing torque of a pump) can be effectively adjusted based on the tendency of the variation of the deviation between a target rotational speed and an actual rotational speed of an engine.

An engine load control device of a work vehicle according to a first aspect is an engine load control device of a work vehicle wherein the rotational speed of an engine is controlled by a rotational speed directing device, and the output of the engine is transmitted to driving wheels and is transmitted via a variable displacement type hydraulic pump to a hydraulic actuator. The engine load control device of a work vehicle includes a target rotational speed detecting portion, an actual rotational speed detecting portion, a variation rate calculating portion and a control portion. The target rotational speed detecting portion is configured to detect a target rotational speed of the engine based on a command from the rotational speed directing device. The actual rotational speed detecting portion is configured to detect an actual rotational speed of the engine. The variation rate calculating portion is configured to calculate a variation rate indicative of a variation amount per unit time of a difference between the detected results of the target rotational speed detecting portion and the actual rotational speed detecting portion. The control portion is configured to adjust a reduction range of the maximum absorbing torque of the variable displacement type hydraulic pump according to the magnitude of the variation rate that is calculated by the variation rate calculating portion.

In this configuration, for example, in a work vehicle such as a wheel loader, the target rotational speed of the engine and the actual rotational speed of the engine (actual rotational speed) are obtained, and deviation (first deviation) between the target and actual rotational speeds is calculated. The target rotational speed of the engine is detected based on the direction or command (the degree of accelerator opening etc.) from the rotational speed directing device. Subsequently, when a predetermined period of time elapses, similarly, target rotational speed of the engine and the actual rotational speed (actual rotational speed) of the engine are obtained, and deviation (second deviation) between the target and actual rotational speeds is calculated. Then, the variation rate calculating portion calculates a variation amount per unit time (variation rate) between the first deviation and the second deviation. The control portion accurately recognizes the load state of the engine based on the magnitude of this variation rate, and adjusts a reduction range of the maximum absorbing torque of the variable displacement type hydraulic pump.

Specifically, for example, in the case where the aforementioned variation rate is large, this means that the actual rotational speed quickly approaches the target rotational speed. Accordingly, in this case, the reduction range of the maximum absorbing torque of the variable displacement type hydraulic pump is controlled smaller than a normal case. On the other hand, in the case where the aforementioned variation rate is small, this means that the actual rotational speed slowly approaches the target rotational speed. Accordingly, in this case, the reduction range of the maximum absorbing torque of the variable displacement type hydraulic pump is controlled larger than the normal case.

Thus, in the case where the aforementioned variation rate is large, it is expected that the actual rotational speed of the engine quickly reaches the target rotational speed. Accordingly, the reduction range of the maximum absorbing torque of the variable displacement type hydraulic pump is set small so that the hydraulic actuator such as a working unit is quickly activated. As a result, it is possible to reduce response time of the engine, and additionally to improve the workability of the working unit and the like. On the other hand, in the case where the aforementioned variation rate is small, it is expected that the actual rotational speed takes time to reach the target rotational speed. Accordingly, the reduction range of the maximum absorbing torque of the variable displacement type hydraulic pump is set large to give a higher priority to response of the engine. As a result, it is possible to further reduce response time of the engine as compared with the known engine load control device.

Consequently, even when values of the deviation between the engine target rotational speed and the actual rotational speed are the same, it is possible to appropriately adjust a reduction range of the maximum absorbing torque of the variable displacement type hydraulic pump depending on situations.

The engine load control device of a work vehicle according to a second aspect is the engine load control device of a work vehicle according to the first aspect, wherein the control portion is configured to control a plurality of variable displacement type hydraulic pumps each provided with a corresponding hydraulic actuator to change a value of the reduction range of maximum absorbing torque of each of the variable displacement type hydraulic pumps according to the variation rate.

In this configuration, the plurality of variable displacement type hydraulic pumps is provided for use as a steering device corresponding to the plurality of hydraulic actuators, a fan and a working unit, for example. The control portion differently controls the plurality of variable displacement type hydraulic pumps according to the magnitude of the aforementioned variation rate.

Accordingly, an optimum maximum absorbing torque can be assigned for each of the variable displacement type hydraulic pumps corresponding to the hydraulic actuators that drive the steering device, the fan and the working unit. Therefore, it is possible to increase the rotational speed of the engine within a short time, and additionally to improve the workability of the working unit and the like.

The engine load control device of a work vehicle according to a third aspect is the engine load control device of a work vehicle according to the first or second aspect, wherein the control portion is configured to control an EPC current that controls the discharge amount of the variable displacement type hydraulic pump so that the reduction range of the maximum absorbing torque of the variable displacement type hydraulic pump is adjusted.

In this configuration, when adjusting the reduction range of the maximum absorbing torque of the variable displacement type hydraulic pump, the control portion controls the EPC current that adjusts a discharge amount of the variable displacement type hydraulic pump.

Accordingly, it is possible to easily control the magnitude of the maximum absorbing torque of the variable displacement type hydraulic pump by adjustment of the discharge amount of the variable displacement type hydraulic pump.

The engine load control device of a work vehicle according to a fourth aspect is the engine load control device of a work vehicle according to any one of the first to third aspects, wherein, when detecting that input to the rotational speed directing device and input of an operation command to the hydraulic actuator are conducted substantially at the same time, the control portion is configured to adjust the reduction range of the maximum absorbing torque of the variable displacement type hydraulic pump.

In this configuration, when input to the rotational speed directing device (e.g., depression of an accelerator pedal) and operation direction to the hydraulic actuator (e.g., operation of the steering device, the working unit, etc.) are conducted substantially at the same time, the adjustment of the reduction range of the maximum absorbing torque of the aforementioned variable displacement type hydraulic pump is controlled.

Usually, in the low idle state where an engine is held at a low rotational speed, if an operator depresses the accelerator pedal while rapidly operating a steering device or a control lever for the working unit, the capacity of the variable displacement type hydraulic pump sharply increases, and as a result it is prevented to increase the rotational speed of the engine.

For this reason, in such a situation, the maximum absorbing torque of the variable displacement type hydraulic pump is controlled as stated above. As a result, it is possible to smoothly increase the rotational speed of the engine, and additionally to effectively operate the steering device, the working unit and the like.

The engine load control device of a work vehicle according to a fifth aspect is the engine load control device of a work vehicle according to any one of the first to fourth aspects, wherein the control portion is configured to calculate the variation rate each time a predetermined period of time elapses.

In this configuration, the control portion calculates the aforementioned variation rate of the deviation between the target and actual rotational speeds of the engine each time the predetermined period of time elapses.

Accordingly, it is possible to easily recognize how the state of a load that is applied to the engine varies, and thus to adjust the maximum absorbing torque of the variable displacement type hydraulic pump to provide an optimum reduction range as the situation changes.

The engine load control device of a work vehicle according to a sixth aspect is the engine load control device of a work vehicle according to any one of the first to fifth aspects, wherein, when the variation rate is not less than a predetermined threshold value, the control portion is configured not to perform adjustment of the maximum absorbing torque of the variable displacement type hydraulic pump.

In this configuration, the aforementioned adjustment control of the maximum absorbing torque of the variable displacement type hydraulic pump is not conducted when the aforementioned variation rate is not less than the predetermined value.

Here, when the variation rate as the difference per unit time between the target and actual rotational speeds of the engine is not less than the predetermined value, this means that the actual rotational speed quickly approaches the target rotational speed.

For this reason, when it is detected that the magnitude of the aforementioned variation rate is not less than the predetermined value, it can be considered that, even in the case where the reduction range of the maximum absorbing torque is held at a not-adjusted, assigned value, the actual rotational speed of the engine will immediately reach the target rotational speed. Accordingly, the procedure can go to a normal control state without the adjustment control of the reduction range of the maximum absorbing torque of the variable displacement type hydraulic pump.

The engine load control device of a work vehicle according to a seventh aspect is the engine load control device of a work vehicle according to any one of the first to sixth aspects, wherein the target rotational speed detecting portion is configured to detect the target rotational speed of the engine based on the command from an accelerator pedal that adjusts the rotational speed of the engine as the rotational speed directing device.

In this configuration, an accelerator pedal is used as the rotational speed directing device.

Accordingly, the target rotational speed detecting portion can easily detect the target rotational speed based on the stroke amount of the accelerator pedal.

DETAILED DESCRIPTION OF THE PREFERRED EMBODIMENTS

With reference to FIGS. 1 to 12, the following description will describe a wheel loader that includes an engine load control device of a controlled work vehicle with a hydraulic circuit according to an embodiment of the present invention.

Configuration of Wheel Loader 50

Figure 1:
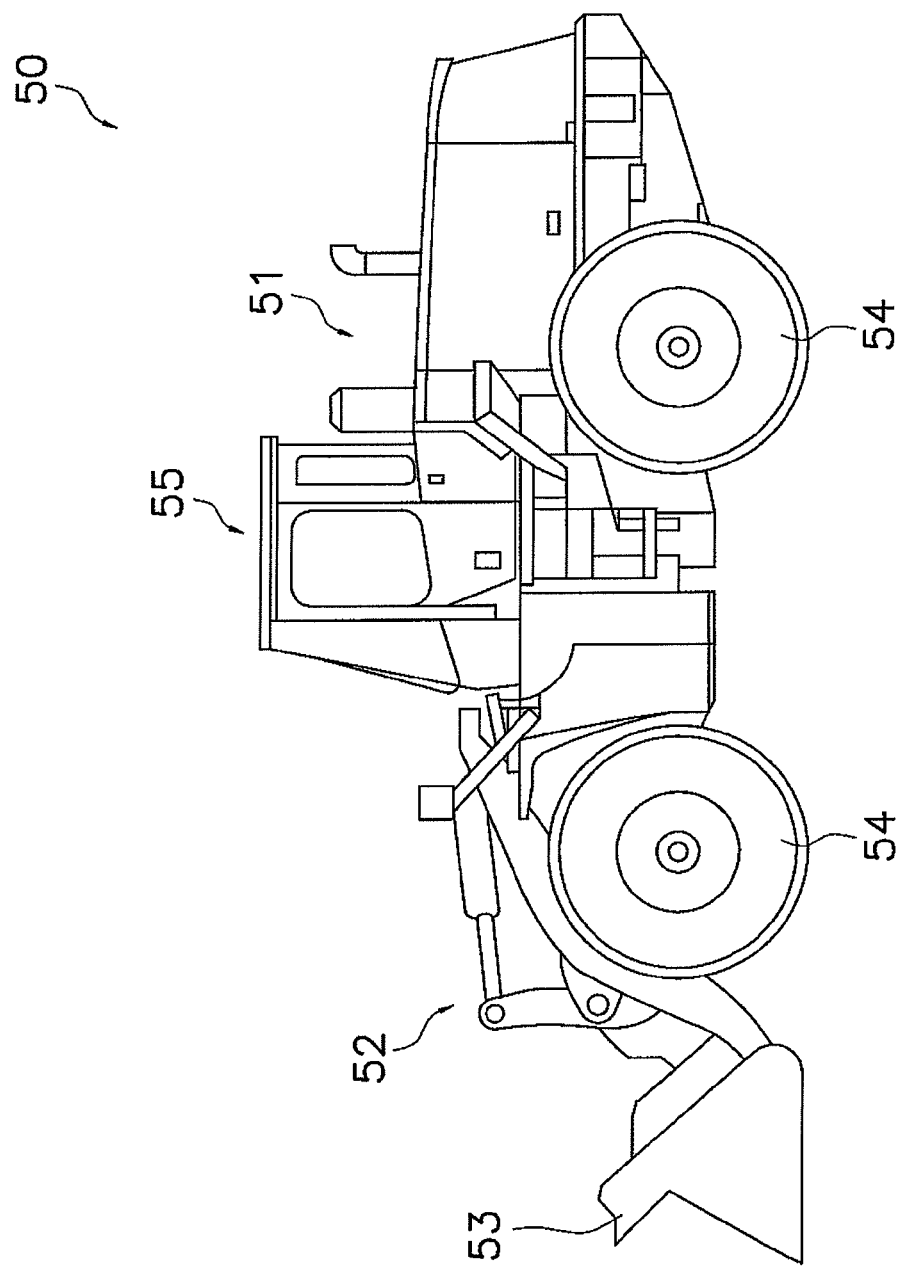
FIG. 1 is a side view showing the configuration of a wheel loader that includes an engine load control device of a work vehicle according to an embodiment of the present invention.

As shown in FIG. 1, the wheel loader (work vehicle) 50 according to the embodiment of the present invention includes a body unit 51, lift arms 52, a bucket 53, four tires 54, and a cab 55. The lift arms 52 are mounted to the front part of the body unit. The bucket 53 is mounted to the fore end of the lift arms 52. The tires 54 support the body unit 51, and rotate so that the body unit runs. The cab 55 is mounted on an upper part of the body unit 51.

Figure 2:
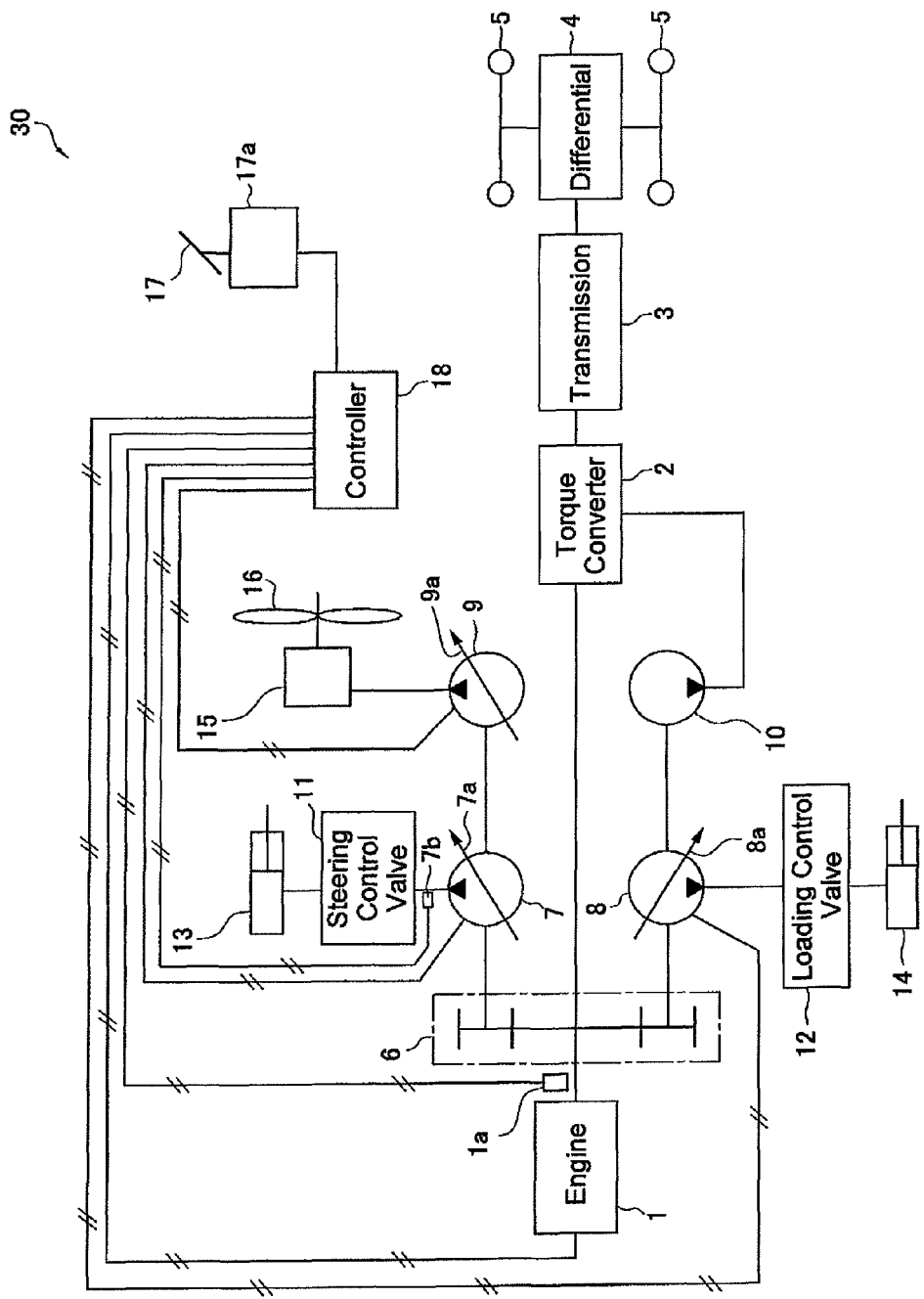
FIG. 2 is a control block diagram showing the configuration of the engine load control device that is installed in the wheel loader shown in FIG. 1.

The body unit 51 includes an engine room that accommodates an engine 1 (see FIG. 2), and a controller (control portion, and variation rate calculating portion) 18 (see FIG. 2). The controller 18 controls control valves for driving the lift arms 52 and the bucket 53, actuators (hydraulic cylinders 13 and 14, and hydraulic motor 15), and the like. In addition, as shown in FIG. 2, the aforementioned engine 1, the controller 18 and the like are installed in the body unit 51. The configuration of a control block shown in FIG. 2 will be described later.

The lift arms 52 are arm members that lift the bucket 53 mounted to the fore end of the lift arms 52, and are actuated by lift cylinders that are installed together.

The bucket 53 is mounted to the fore end of the lift arms 52. A bucket cylinder controls dumping and tilting of the bucket 53.

The cab 55 has Rollover Protective Structure (ROPS), and forms an operator compartment for an operator that is constructed by combining a plurality of steel pipes and steel plates. The cab 55 is disposed slightly frontward of the middle part of the body unit 51.

Internal Configuration of Wheel Loader 50

Main Structures

As shown in FIG. 2, the wheel loader 50 mainly includes an engine 1, running and working mechanisms that are driven by this engine 1, and an engine load control device (an engine load control device of a work vehicle) 30 inside the wheel loader 50. The engine load control device 30 includes the controller 18 that controls these mechanisms, and the like. A PTO (power takeoff) mechanism 6 that is composed of gears and shafts is provided between the engine 1 and the mechanisms.

The engine 1 is a diesel engine. The output of the engine 1 is controlled by adjustment of the amount of fuel that is injected into cylinders. Such adjustment of the amount of fuel that is injected into the cylinders is conducted by controlling a governor that is attached to a fuel pump of the engine 1. In this embodiment, a typical all-speed-control type governor is used as the governor. That is, the governor increases/decreases the fuel injection amount to eliminate the difference between a target rotational speed according to the stroke amount of an accelerator pedal (rotational speed directing device) 17, and an actual engine rotational speed.

The running mechanism includes a torque converter 2 that receives the output of the engine 1, a transmission 3 that is coupled to the torque converter 2, a differential gear 4 that is coupled to an output shaft of the transmission 3, and driving wheels 5. The transmission 3 includes a forward hydraulic clutch, a reverse hydraulic clutch, a plurality of transmission clutches, and the like. Forward/reverse switching operation and shifting transmission can be conducted by ON/OFF control of the hydraulic clutches.

In addition to the running mechanism, this wheel loader 50 includes mainly a steering mechanism, a loading device that is arranged in front of the body unit (both are not shown), and a fan 16.

To drive these mechanisms, hydraulic pumps (variable displacement type hydraulic pumps) 7 to 9, and the actuators (the hydraulic cylinders 13 and 14, and the hydraulic motor 15) are provided. That is, to drive the steering mechanism, the steering hydraulic pump 7, a steering control valve 11, and the loading hydraulic cylinder 13 that is connected to the steering mechanism are provided. Also, to drive the loading device, the loading hydraulic pump 8, a loading control valve 12, and the loading hydraulic cylinder 14 that is connected to the loading device are provided. Furthermore, to drive the fan 16, the fan hydraulic pump 9, and the fan hydraulic motor 15 are provided. Each of these hydraulic pumps 7, 8 and 9 is coupled to the engine 1 via the PTO mechanism 6. In addition, a torque converter lubricating hydraulic pump 10 is also provided for the torque converter 2. This hydraulic pump 10 is coupled to the engine 1 via the PTO mechanism 6.

The steering hydraulic pump 7, the loading hydraulic pump 8, and the fan hydraulic pump 9 are variable displacement type hydraulic pumps that include swash plates 7a, 8a, and 9a, respectively. A pump capacity q (cc/rev) can be controlled by varying the swash angle of each of the swash plates 7a, 8a, and 9a.

Configuration for Engine Load Control

Also, in the wheel loader 50 according to this embodiment, in order to control the load of the engine 1, as shown in FIG. 2, the engine load control device 30 includes an engine rotational speed sensor (actual rotational speed detecting portion) 1a that detects the rotational speed of the engine, a stroke sensor (target rotational speed detecting portion) 17a that detects the opening degree of the accelerator pedal 17, a discharge pressure sensor 7b that detects the discharge pressure of the steering hydraulic pump 7a, and the controller 18.

The controller 18 is a microcomputer that is composed of a CPU, a RAM, a ROM and the like, and receives the sensor output of the engine rotational speed sensor 1a, the sensor output of the stroke sensor 17a of the accelerator pedal 17, and the sensor output of the discharge pressure sensor 7b of the steering hydraulic pump 7a as shown in FIG. 2. The controller 18 provides control signals to the engine 1, and the hydraulic pumps 7, 8 and 9.

Figure 3:
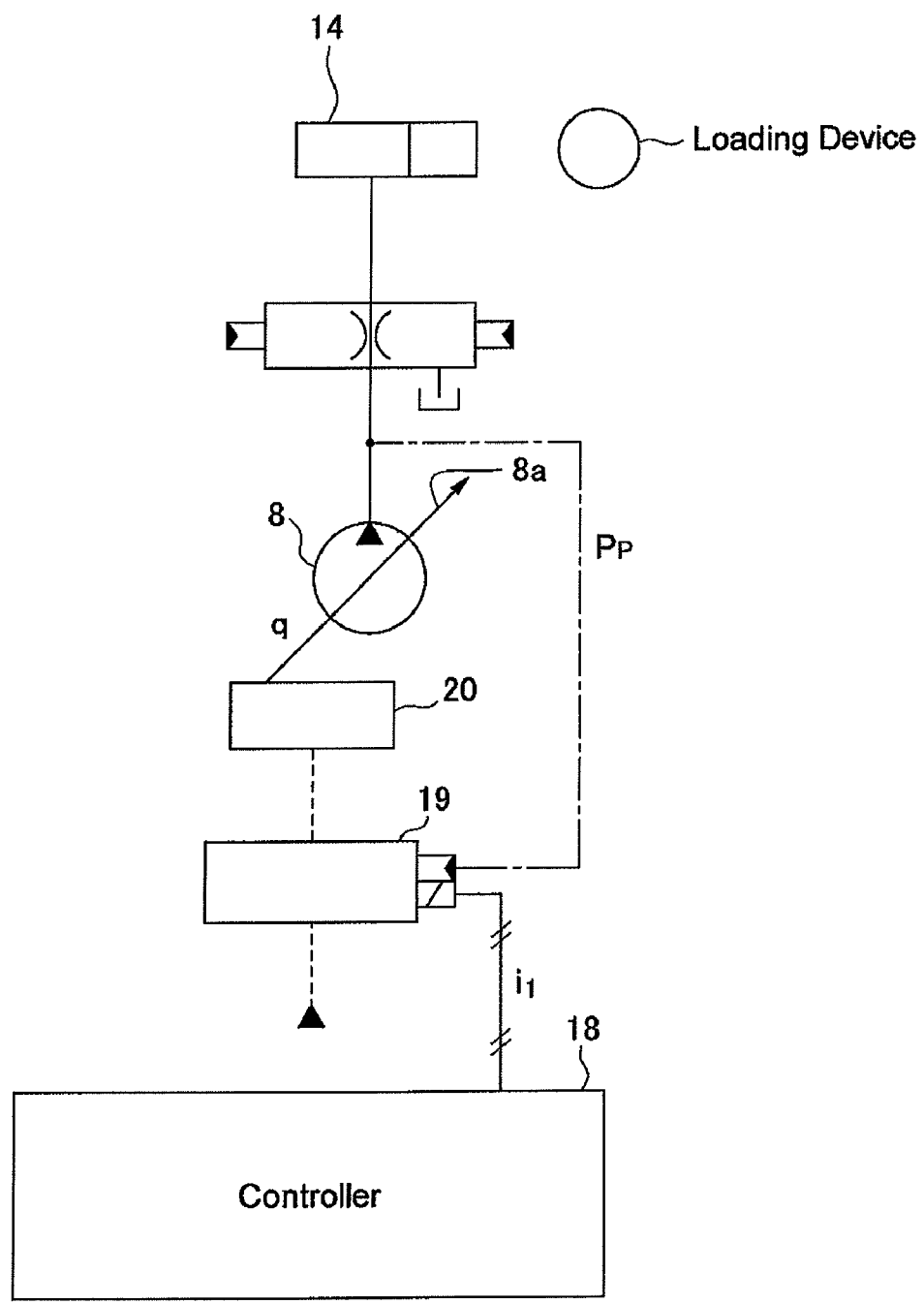
FIG. 3 is a PC control block diagram of a loading hydraulic pump shown in FIG. 2.

For example, in order to control the loading hydraulic pump 8 on the loading device side, a control block as shown in FIG. 3 is configured. Note that, although FIG. 3 shows the configuration for controlling the loading hydraulic pump 8, similar control blocks are configured for other variable displacement type hydraulic pumps 7 and 9. For this reason, their description is omitted.

In this embodiment, to control the swash plate 8a of the hydraulic pump 8, a PC valve (power control valve) 19 and a servovalve 20 are provided as shown in FIG. 3. The discharge pressure Pp (kg/cm$^2$) of the hydraulic pump 8 is applied as pilot pressure to the PC valve 19, and a control signal i1 from the controller 18 is provided to the PC valve 19. The servovalve 20 is supplied with pressure oil from the PC valve 19, and controls the capacity q of the hydraulic pump 8. More specifically, the PC valve 19 controls the swash plate 8a of the hydraulic pump 8 so that the product of the discharge pressure Pp of the hydraulic pump 8 and the capacity q of the hydraulic pump 8 does not exceed certain torque. Accordingly, in the case where the rotational speed of the engine 1 is constant, the swash plate 8a of the hydraulic pump 8 is controlled so that the product of the discharge pressure Pp of the hydraulic pump 8 and the capacity q of the hydraulic pump 8 does not exceed certain power.

Figure 4:
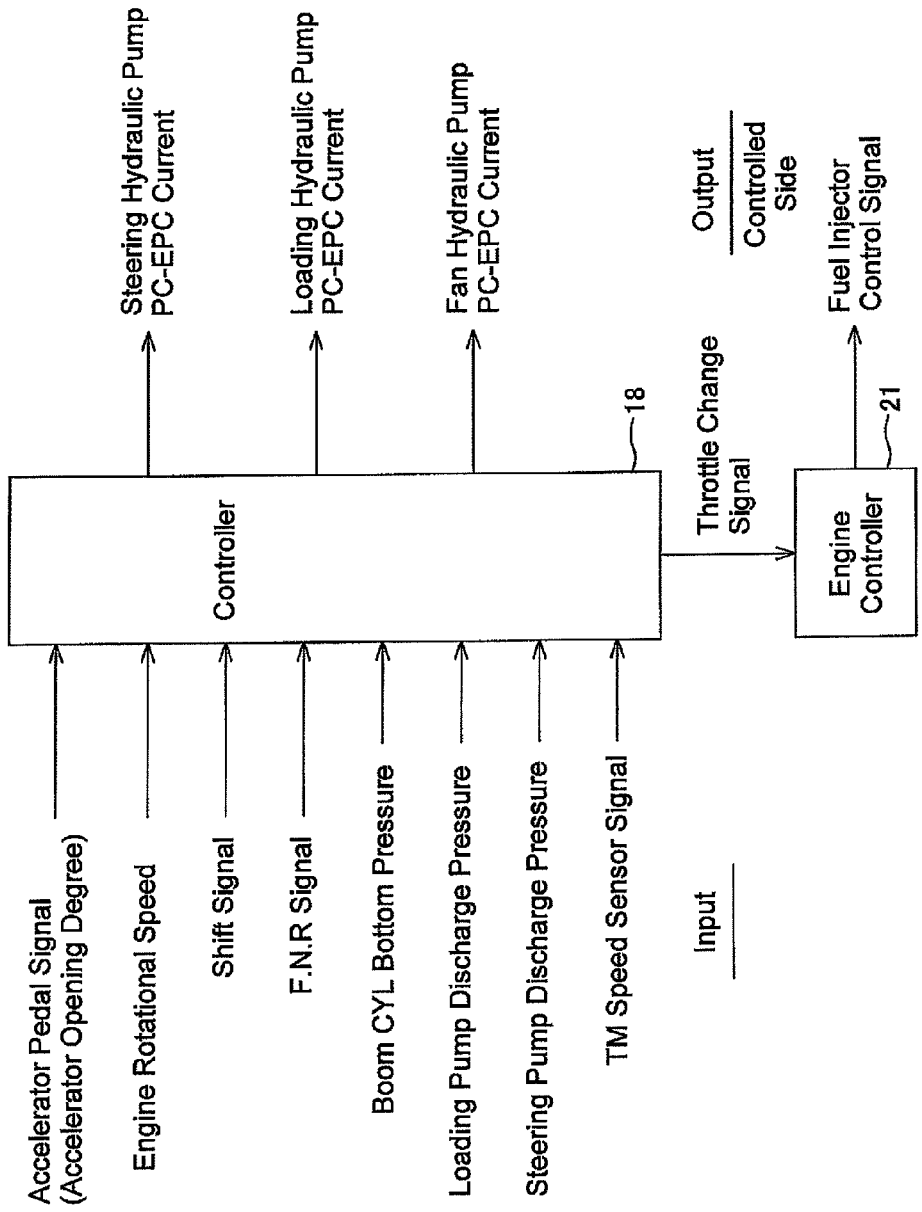
FIG. 4 is a control block diagram showing input/output information of a controller shown in FIG. 2.

As shown in FIG. 4, the controller 18 receives an accelerator pedal signal (the degree of accelerator opening), an engine rotational speed, a gear ratio signal, an FNR (forward, neutral, reverse) signal, a boom cylinder bottom pressure, a loading hydraulic pump discharge pressure, a steering hydraulic pump discharge pressure, a transmission (TM) speed sensor signal, and the like. A throttle change signal is provided from the controller 18 to the engine controller 21. A fuel injector control signal is provided from the engine controller 21. Also, the controller 18 calculates an optimum value of loading hydraulic pump PC-EPC current based on the accelerator pedal signal, the engine rotational speed and the like that are provided to the controller 18, and provides the calculated optimum value to the hydraulic pump 8. Note that a steering hydraulic pump PC-EPC current and a fan hydraulic pump PC-EPC current are similarly provided to other hydraulic pumps 7 and 9, respectively.

Specifically, the controller 18 determines the PC-EPC current (mA) according to the magnitude of the deviation between the target and actual rotational speeds of the engine 1 to provide response improvement of the engine 1 and engine stalling prevention. In addition, the PC-EPC current corresponds to the signal i that is provided from the controller 18 to the PC valve 19 as shown in FIG. 3. As the current increases, the swash angle of the swash plate 8a decreases, and the discharge amount of the hydraulic pump decreases. The absorbing torque of the hydraulic pump correspondingly decreases (pump capacity correspondingly decreases). Accordingly, when this PC-EPC current is controlled so that the maximum absorbing torque of the hydraulic pump 8 is reduced, the load of the engine 1 can be correspondingly reduced. Note that the same goes for other hydraulic pumps 7 and 9.

Operation of Mechanisms

As shown in FIG. 2, the output of the engine 1 is transmitted via the torque converter 2 to the transmission 3, and this transmission 3 switches forward/reverse running based on ON/OFF control of the hydraulic clutch. Also, transmission control is conducted based on ON/OFF control of the transmission hydraulic clutch. The output of transmission 3 is transmitted via the differential gear 4 to the driving wheel 5, as shown in FIG. 2.

Also, as shown in FIG. 2, the output of the engine 1 is transmitted via the PTO mechanism 6 to the hydraulic pumps 7, 8, 9 and 10, and the hydraulic pumps are thus driven.

When the steering hydraulic pump 7 is driven, the discharge pressure oil of the steering hydraulic pump 7 is supplied via the steering control valve 11 to the loading hydraulic cylinder 13, as shown in FIG. 2. When this loading hydraulic cylinder 13 is supplied with the pressure oil, the steering mechanism is activated, and the body unit can be thus turned into a desired direction. A spool of the steering control valve 11 moves according to operation of a steering handle (not shown). The opening area of the steering control valve 11 correspondingly varies, and the flow rate that is supplied to the loading hydraulic cylinder 13 thus varies.

Also, when the loading hydraulic cylinder 13 is driven, the discharge pressure oil of the loading hydraulic pump 13 is supplied via the loading control valve 12 to the loading hydraulic cylinder 14, as shown in FIG. 2. When the pressure oil is supplied to the loading hydraulic cylinder 14, the loading device is activated. That is, a boom that composes the loading device can be raised or lowered to tilt the bucket. A spool of the loading control valve 12 moves according to operation of a loading operation lever (not shown). The opening area of the control valve 12 correspondingly varies, and the flow rate that is supplied to the loading hydraulic cylinder 14 thus varies.

When the fan hydraulic pump 9 is driven, the discharge pressure oil of the fan hydraulic pump 9 is supplied to the fan hydraulic motor 15, as shown in FIG. 2, and the cooling fan 16 is activated.

When the torque converter lubricating hydraulic pump 10 is driven, the discharge pressure oil is supplied to the torque converter 2, and the torque converter 2 is thus lubricated.

Control of Engine 1

Figure 5:
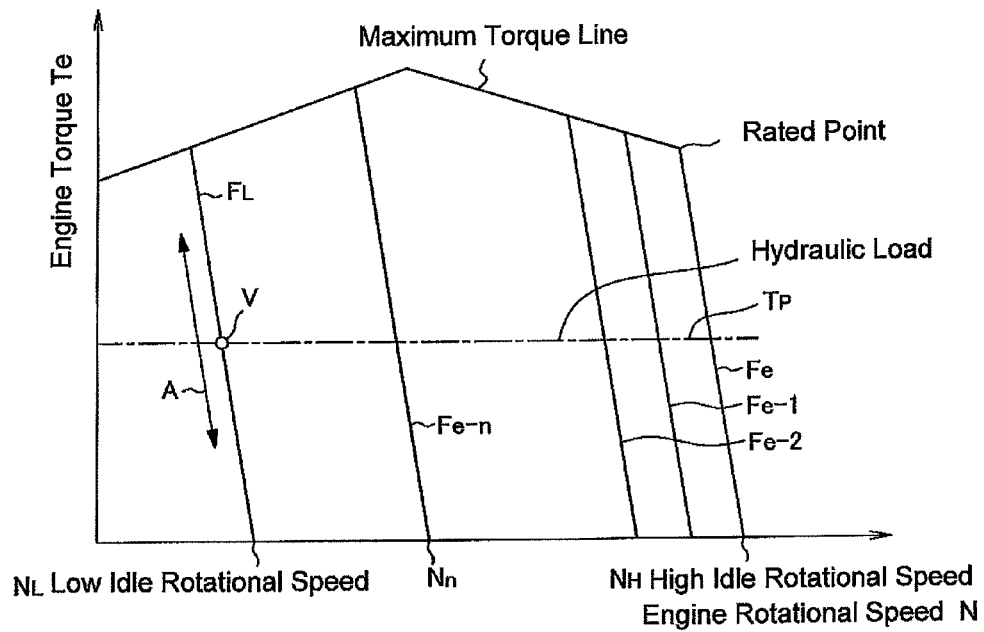
FIG. 5 is a graph showing the relationship between engine rotational speed and engine torque.

Control of the engine 1 by the accelerator pedal 17 is now described. FIG. 5 shows relationship among engine rotational speed N, engine torque Te, and hydraulic pressure load. In FIG. 5, an area that is defined by a maximum torque line indicates performance that can be provided by the engine 1. The engine 1 is controlled through the governor so that the engine torque does not exceed the maximum torque line and does not reach an exhaust smoke limit, and the engine rotational speed N does not exceed a high idle rotational speed $N_H$ and does not reach over-revolution.

For example, in the case where the accelerator pedal 17 is fully depressed, the controller 18 assigns the maximum target rotational speed corresponding to the stroke amount of the accelerator pedal 17, and conducts control of speed through the governor along a maximum speed regulation line Fe that connects a rated point and the high idle point $N_H$. As the stroke amount of the accelerator pedal 17 is getting smaller and the target rotational speed is getting smaller, regulation lines Fe-1, Fe-2, . . . , Fe-n, . . . , $F_L$ are correspondingly defined, and control of speed is conducted along each of the regulation lines.

In the case where the stroke amount of the accelerator pedal 17 is the minimum, in other words, in the case where the accelerator pedal 17 is not depressed, a low idle rotational speed $N_L$ is assigned as the target rotational speed, and control of speed is conducted along the regulation line $F_L$ that is connected to the low idle point $N_L$. In this case, if a hydraulic pressure load Tp varies as shown by an arrow A, a matching point V that balances the output of the engine 1 and pump absorption power moves according to the variation along the regulation line.

According to the characteristics of the engine 1, time for the matching point to move from a low load to a high load along the regulation line is longer in a low rotational speed range (low idle rotational speed $N_L$) than in a high rotational speed range (high idle rotational speed $N_H$). That is, the response of the engine 1 in the low rotational speed range is inferior to that in the high rotational speed range.

Figure 6:
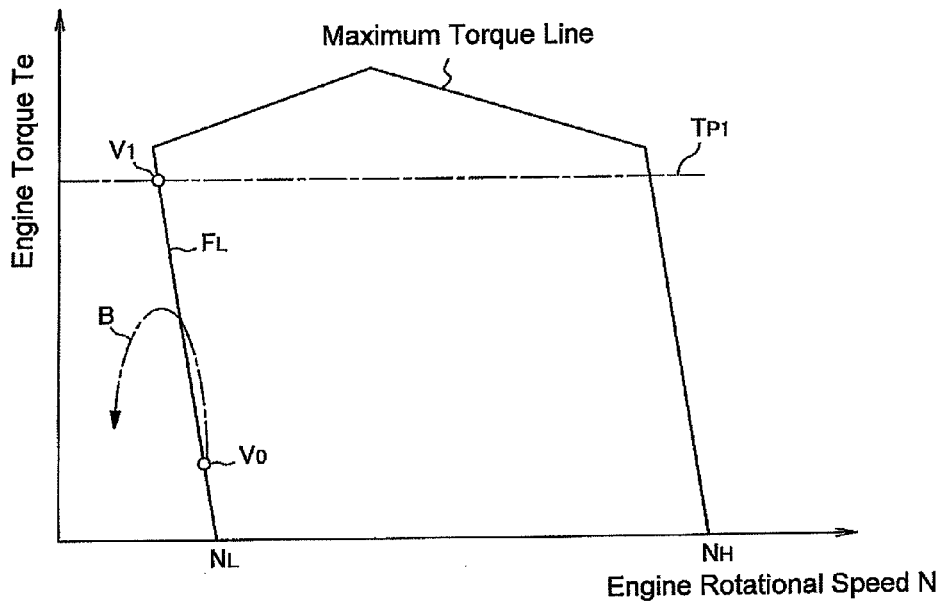
FIG. 6 is a graph showing the relationship between engine rotational speed and engine torque.

For this reason, in the known engine load control device of a work vehicle, in the state where a hydraulic pressure load is low and is matched at a matching point V0, when a high hydraulic pressure load Tp1 is rapidly applied, the engine torque fails to be controlled to raise up to a matching point V1 (see FIG. 6) in time, and as a result the engine may stall as shown by an arrow B in FIG. 6.

Also, in the state where a high hydraulic pressure load is applied to any of the hydraulic pumps 7 to 9, e.g., the hydraulic pump which is for the working unit and the like, in the case where the operator quickly operates the control lever for the working unit, the steering wheel or the like, for example, and if the operator depresses the accelerator pedal 17, the response to the operation of the accelerator pedal 17 also gets worse, it takes time for the engine rotational speed to reach the target rotational speed corresponding to the stroke amount of the accelerator pedal 17 (response). This may make the operator uncomfortable. This makes the operator further depresses the accelerator pedal 17 to excess to accelerate rise of engine rotation. As a result, this causes fuel efficiency reduction.

Engine Load Reduction Control

For this reason, in the engine load control device 30 according to this embodiment, the absorbing torque of the loading hydraulic pump 8 is first controlled to be reduced based on the magnitude of the deviation between the target and actual rotational speeds of the engine 1 so that a load that is applied to the engine 1 is reduced.

Specifically, for example, in the wheel loader 50, when the operator quickly operates the control lever for the working unit and the accelerator pedal 17 substantially at the same time in a low idle state, the controller 18 conducts the following control.

That is, the controller 18 receives the target rotational speed of the engine 1 corresponding to the stroke amount of the accelerator pedal 17, and the actual rotational speed of the engine 1 (actual rotational speed) in the forms of outputs of the stroke sensor 17a and the engine rotational speed sensor 1a. The controller 18 determines whether the deviation between the target and actual rotational speeds is larger than a predetermined value. If this deviation is larger than the predetermined value, it is determined that a large load is applied to the engine 1, and the PC-EPC currents are controlled to be assigned appropriate values so that the maximum absorbing torques of the hydraulic pumps 7 to 9 are suppressed.

To achieve this, the variation rate of the swash angle of the swash plate of the hydraulic pump 8 for driving the working unit is set later at the beginning of the operation. Thus, the increase of the discharge amounts of the hydraulic pumps 7 to 9 is suppressed. Accordingly, it is possible to prevent that most of engine output is used for the hydraulic pumps 7 to 9 for the working unit (loading device) and the like. As a result, it is possible to smoothly increase the engine rotational speed. Then, as the actual rotational speed of the engine 1 that is detected by the engine rotational speed sensor 1a increases, the discharge amounts of the hydraulic pumps 7 to 9 are controlled to increase. As a result, it is possible to improve the response of the engine 1, and additionally to improve the operation speed of the working unit and the like to the operation.

As a result, the operator can feel that the engine 1 responds with the operator's image close to actually stroke amount. For this reason, the operator may not depress the accelerator pedal 17 too much. Therefore, it is possible to avoid fuel efficiency reduction resulted from reduction in response of the engine 1 when the control lever for the working unit and the accelerator pedal 17 are operated much substantially at the same time.

It should be appreciated that, in the case where the maximum absorbing torques of all the hydraulic pumps 7 to 9 are adjusted as in this embodiment, the total of the absorbing torques of all the hydraulic pumps 7 to 9 can be controlled not to exceed a predetermined value.

Maximum Absorbing Torque Control

The control of the loading hydraulic pump 8 is now described in more detail as an example of the control that reduces the maximum absorbing torques of the hydraulic pumps 7 to 9 under the aforementioned control.

As discussed above, the PC valve 19 is provided with the discharge pressure Pp of the hydraulic pump 8 as pilot pressure, and supplies the driving pressure oil to the servovalve 20 according to the discharge pressure Pp. Thus, the capacity q of the hydraulic pump 8 is controlled.

In the loading hydraulic pump 8, the pump capacity q is controlled according to pump discharge pressure within a range in which the hydraulic pressure load, i.e., the absorbing torque, does not exceeds the maximum absorbing torque.

The PC valve 19 is provided with the control signal i1 from the controller 18 under the aforementioned control. The maximum absorbing torque is controlled based on this control signal i1. As the current value that is provided to the PC valve 19 based on this control signal i1 increases, the value of the pump discharge pressure where reduction of pump capacity starts decreases, and the value of the maximum absorbing torque is set to small.

Accordingly, since the PC-EPC current value that is assigned under the aforementioned control is provided to the PC valve 19, the absorbing torque of the loading hydraulic pump 8 can be minimized al minimum decreasing rate by referencing the target and actual rotational speeds of the engine 1. Therefore, it is possible to prevent that engine stalling occurs in the engine 1. In addition to this, it is possible to suppress reduction in response to the depression of the accelerator pedal 17, and to effectively operate the working unit, and the like.

Maximum Absorbing Torque Adjustment Control According To Approaching Rate Between Target Rotational Speed And Actual Rotational Speed In addition, the engine load control device 30 according to this embodiment reduces the maximum absorbing torques in the hydraulic pumps 7 to 9 under the aforementioned maximum absorbing torque control in the hydraulic pumps 7 to 9 to control the magnitude of a load applied to the engine 1, and conducts the following control based on the magnitude of the approaching rate (variation rate) of the actual rotational speed relative to the target rotational speed of the engine 1.

That is, in the engine load control device 30, the controller 18 calculates the approaching rate α that is the approaching amount per unit time of the actual rotational speed relative to the target rotational speed of the engine 1, i.e., the variation amount (variation rate) of the deviation between the target and actual rotational speeds per unit time, based on the following relation formula (1). The controller 18 more appropriately adjusts the reduction ranges of the maximum absorbing torques of the hydraulic pumps 7 to 9 that are assigned under the aforementioned absorbing torque control according to the magnitude of this approaching rate α.

$$\alpha = [(Ne1 - No1) - (Ne2 - No2)]/(t2 - t1) \quad (1)$$

In the formula (1), Ne1 and No1 are a target rotational speed and an actual rotational speed of the engine 1 at time t1, respectively, and Ne2 and No2 are a target rotational speed and an actual rotational speed of the engine 1 at time t2, respectively.

In this case, if the value of the approaching rate α is small, the deviation between the target and actual rotational speeds at time t2 does not substantially vary from the deviation between the target and actual rotational speeds at time t1. This means that a large load is kept applied to the engine 1. For this reason, if the value of the approaching rate α is small, it is desirable to control the PC-EPC current so as to further reduce the maximum absorbing torques of the hydraulic pumps 7 to 9 to further suppress the load that is applied to the engine 1.

Conversely, if the value of the approaching rate α is large, the deviation between the target and actual rotational speeds at time t2 is getting smaller smoothly to the deviation between the target and actual rotational speeds at time t1. This means that a load that is applied to the engine 1 is getting smaller. For this reason, if the value of the approaching rate α is large, it is desirable to control the PC-EPC current so as to slightly reduce the reduction ranges of the maximum absorbing torques of the hydraulic pumps 7 to 9 to provide an output of the engine 1 to the hydraulic pumps 7 to 9 such as for the working unit.

Figure 7:
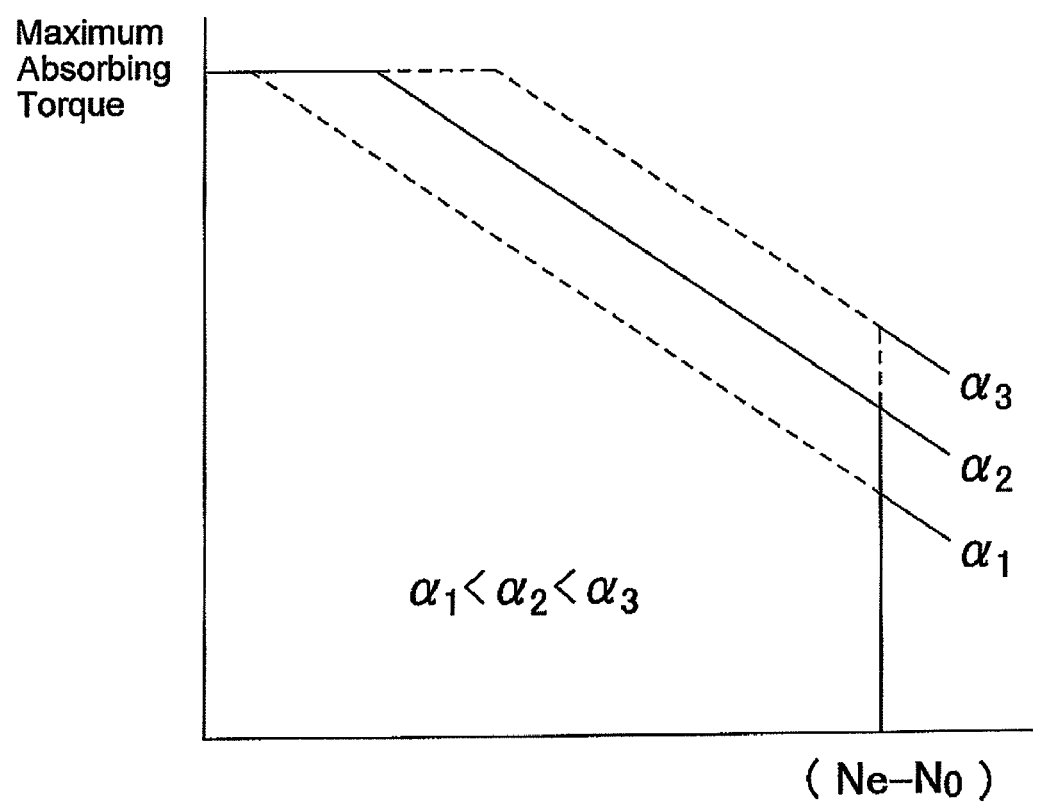
FIG. 7 is a graph showing a different control depending on the approaching rates between the target and actual rotational speeds when the maximum absorbing torque of the hydraulic pump is adjusted according to the magnitude of the deviation between the target and actual rotational speeds of an engine.

Accordingly, for example, in the case where the approaching rate α between the target and actual rotational speeds of the engine 1 is α1, α2 and α3 (α1<α2<α3), as shown in FIG. 7, the reduction range of the maximum absorbing torque of each of the hydraulic pumps 7 to 9 that is assigned under the aforementioned maximum absorbing torque reduction control can be appropriately adjusted according to the magnitude of the deviation between the target and actual rotational speeds Ne and No at time t2. In this embodiment, the steering hydraulic pump 7, the loading hydraulic pump 8, and the fan hydraulic pump 9 are subject to this control to adjust the reduction range of the maximum absorbing torque according to the magnitude of the approaching rate α as shown in FIGS. 8(a) to 10(b).

In the cases of FIGS. 8(a) to 10(b), the horizontal axis indicates the deviation between the target and actual rotational speeds Ne2 and No2 (Ne2−No2) at time t2, and the vertical axis indicates the maximum absorbing torques of the hydraulic pumps 7 to 9 (Max is defined as 100%). The approaching rate α varies in a range of 0 to 1.5 rpm/ms. In this embodiment, the response time is 1 second from the low idle of 750 rpm to the high idle of 2245 rpm. The maximum of the approaching rate α (1.5 rpm/ms) is specified based on the deviation between the high and low idling rotational speeds (1500 rpm) and the response time (1 second).

Control of Steering Hydraulic Pump 7

In the steering hydraulic pump 7, as shown in FIG. 8(a), in a graph showing the relationship between the magnitude of the deviation between the target and actual rotational speeds Ne2 and No2 at time t2, and the maximum absorbing torque of the steering hydraulic pump 7, in the case of the approaching rate $\alpha=1.5$, as compared with the case of $\alpha=0$, the reduction range of the maximum absorbing torque of the hydraulic pump 7 is controlled to be small (see a dotted line in FIG. 8(a)), if the deviation of the rotational speeds (Ne2−No2) is comparatively large.

Specifically, in the case of the approaching rate $\alpha=0$, if the deviation of the rotational speeds Ne2−No2≦600, the maximum absorbing torque is held at 100%. Also, when the deviation of the rotational speeds Ne2−No2=1500, the maximum absorbing torque is 70%. Also, if the deviation of the rotational speeds is in the range of 600<Ne2−No2<1500, as shown in FIG. 8(a), the maximum absorbing torque with respect to the deviation of the rotational speeds Ne2−No2 can be obtained by linear interpolation between the maximum absorbing torque of 100% and 70%.

In the case of the approaching rate $\alpha=1.5$, if the deviation of the rotational speeds Ne2−No2≦900, the maximum absorbing torque is held at 100%. Also, if the deviation of the rotational speeds Ne2−No2=1500, the maximum absorbing torque is reduced to 80%. Also, if the deviation of the rotational speeds is in the range of 900<Ne2−No2<1500, as shown in FIG. 8(a), the maximum absorbing torque can be obtained according to the deviation of the rotational speeds Ne2−No2 based on linear interpolation between the maximum absorbing torque of 100% and 80%.

A value to be assigned as the maximum absorbing torque of the steering hydraulic pump 7 can be increased/reduced by the aforementioned control of the PC-EPC current (see FIG. 8(b)). Specifically, in the case of the approaching rate $\alpha=0$, the PC-EPC current value is 240 mA if the deviation of the rotational speeds Ne2−No2=1500, and if the approaching rate $\alpha=1.5$, the PC-EPC current value is 160 mA. Thus, if the value of the approaching rate $\alpha$ is large, the PC-EPC current is set small. As a result, the discharge amount of the hydraulic pump 7 is increased, and the reduction range of the maximum absorbing torque is reduced so that the output of the engine 1 is provided to the hydraulic pump 7. Consequently, it is possible to improve the response of the engine 1, and additionally to improve the response to steering operation.

Control of Fan Hydraulic Pump 9

Also, in the fan hydraulic pump 9, as shown in FIG. 9(a), in a graph showing the relationship between the magnitude of the deviation between the target and actual rotational speeds Ne2 and No2 at time t2, and the maximum absorbing torque of the fan hydraulic pump 9, in the case of the approaching rate $\alpha=1.5$, as compared with the case of $\alpha=0$, the reduction range of the maximum absorbing torque of the hydraulic pump 9 is controlled to be small (see a dotted line in FIG. 9(a)), if the deviation of the rotational speeds (Ne2−No2) is comparatively large.

Specifically, in the case of the approaching rate $\alpha=0$, if the deviation of the rotational speeds Ne2−No2≦400, the maximum absorbing torque is held at 100%. Also, if the deviation of the rotational speeds Ne2−No2=1500, the maximum absorbing torque is reduced to 15%. Also, if the deviation of the rotational speeds is in the range of 400<Ne2−No2<1500, as shown in FIG. 9(a), the maximum absorbing torque with respect to the deviation of the rotational speeds Ne2−No2 can be obtained by linear interpolation between the maximum absorbing torque of 100% and 15%.

In the case of the approaching rate $\alpha=1.5$, if the deviation of the rotational speeds Ne2−No2≦800, the maximum absorbing torque is held at 100%. Also, if the deviation of the rotational speeds Ne2−No2=1500, the maximum absorbing torque is reduced to 50%. Also, if the deviation of the rotational speeds is in the range of 800<Ne2−No2<1500, as shown in FIG. 9(a), the maximum absorbing torque with respect to the deviation of the rotational speeds Ne2−No2 can be obtained by linear interpolation between the maximum absorbing torque of 100% and 50%.

A value to be assigned as the maximum absorbing torque of the fan hydraulic pump 9 can be increased/reduced by the aforementioned control of the PC-EPC current (see FIG. 9(b)) similarly to the steering hydraulic pump 7. Specifically, in the case of the approaching rate $\alpha=0$, the PC-EPC current value is 680 mA if the deviation of the rotational speeds Ne2−No2=1500, and if the approaching rate $\alpha=1.5$, the PC-EPC current value is 400 mA. Thus, if the value of the approaching rate $\alpha$ is large, the PC-EPC current is set small. As a result, the discharge amount of the hydraulic pump 9 is increased, and the reduction range of the maximum absorbing torque is reduced so that the output of the engine 1 is provided to the hydraulic pump 9. Consequently, it is possible to improve the response of the engine 1, and additionally to improve the response to fan rotational speed change operation.

Control of Loading Hydraulic Pump 8

Also, in the loading hydraulic pump 8, as shown in FIG. 10(a), in a graph showing the relationship between the magnitude of the deviation between the target and actual rotational speeds Ne2 and No2 at time t2, and the maximum absorbing torque of the loading hydraulic pump 8, in the case of the approaching rate $\alpha=1.5$, as compared with the case of $\alpha=0$, the reduction range of the maximum absorbing torque of the hydraulic pump 8 is controlled to be small (see a dotted line in FIG. 10(a)), if the deviation of the rotational speeds (Ne2−No2) is comparatively large.

Specifically, in the case of the approaching rate $\alpha=0$, if the deviation of the rotational speeds Ne2−No2≦200, the maximum absorbing torque is held at 100%. Also, if the deviation of the rotational speeds Ne2−No2=1500, the maximum absorbing torque is reduced to 15%. Also, if the deviation of the rotational speeds is in the range of 200<Ne2−No2<1500, as shown in FIG. 10(a), the maximum absorbing torque with respect to the deviation of the rotational speeds Ne2−No2 can be obtained by linear interpolation between the maximum absorbing torque of 100% and 15%.

In the case of the approaching rate $\alpha=1.5$, if the deviation of the rotational speeds Ne2−No2≦500, the maximum absorbing torque is held at 100%. Also, if the deviation of the rotational speeds Ne2−No2=1500, the maximum absorbing torque is reduced to 45%. Also, if the deviation of the rotational speeds is in the range of 500<Ne2−No2<1500, as shown in FIG. 10(a), the maximum absorbing torque can be obtained according to the deviation of the rotational speeds Ne2−No2 based on linear interpolation between the maximum absorbing torque of 100% and 45%.

A value to be assigned as the maximum absorbing torque of the loading hydraulic pump 8 can be increased/reduced by the aforementioned control of the PC-EPC current (see FIG. 10(b)) similarly to the steering hydraulic pump 7. Specifically, in the case of the approaching rate $\alpha=0$, the PC-EPC current value is 680 mA if the deviation of the rotational speeds Ne2−No2=1500, and if the approaching rate $\alpha=1.5$, the PC-EPC current value is 440 mA. Thus, if the value of the approaching rate $\alpha$ is large, the PC-EPC current is set small. As a result, the discharge amount of the hydraulic pump 8 is increased, and the reduction range of the maximum absorbing torque is reduced so that the output of the engine 1 is provided to the hydraulic pump 8. Consequently, it is possible to improve the response of the engine 1, and additionally to improve the response to operation of the control lever for the working unit or the like.

In this embodiment, as discussed above, the reduction ranges of the maximum absorbing torques of the hydraulic pumps 7 to 9 that are assigned under the engine load reduction control are adjusted to more appropriate values according to the magnitude of the approaching rate α per unit time between the actual rotational speed No of the engine 1 relative to the target rotational speed Ne.

Accordingly, even in the case where values of the deviation between the target and actual rotational speeds Ne and No are the same, the reduction range of the maximum absorbing torque is adjusted in consideration of the variation between previous and current values of the aforementioned deviation, providing accurate recognition of the conditions of a load that is applied to the engine 1. Therefore, it is possible to improve the response of the engine 1, and in addition to this the response during operation of the working unit or the like.

Figure 8:
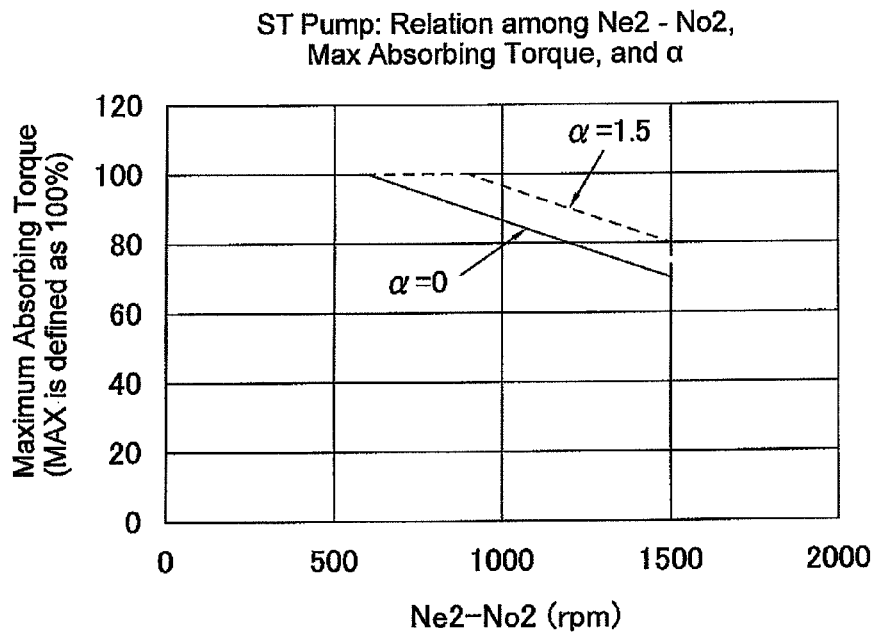
FIG. 8(a) is a graph showing a relationship between the maximum absorbing torque of a steering hydraulic pump, and the magnitude of the deviation between the target and actual rotational speeds.
FIG. 8(b) is a table showing a relationship between PC-EPC current values and the maximum absorbing torques of the steering hydraulic pump that is used to differently control the maximum absorbing torque of the hydraulic pump depending on the approaching rates between the target and actual rotational speeds.
Figure 9:
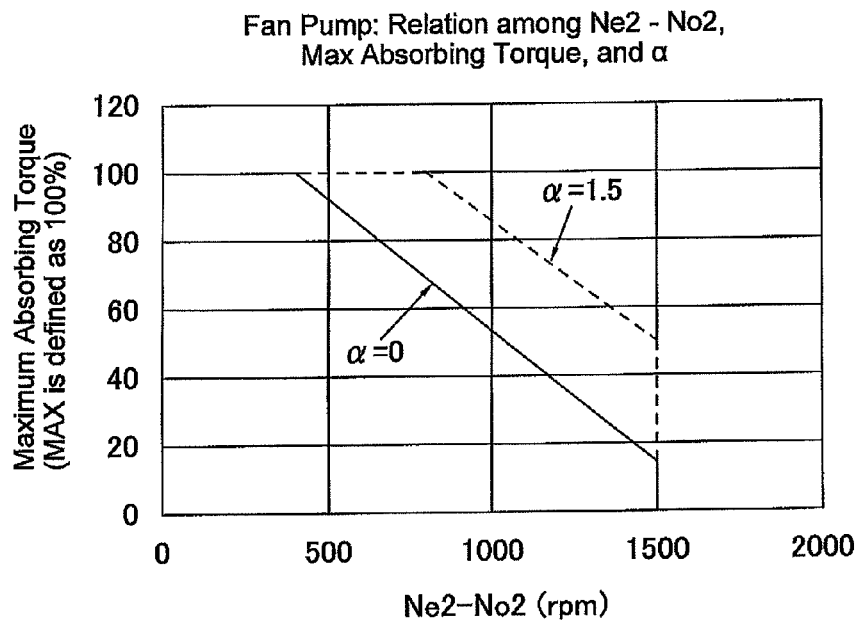
FIG. 9(a) is a graph showing relationship between the maximum absorbing torque of a fan hydraulic pump, and the magnitude of the deviation between the target and actual rotational speeds.
FIG. 9(b) is a table showing relationship between PC-EPC current values and the maximum absorbing torques of the fan hydraulic pump that is used to differently control the maximum absorbing torque of the hydraulic pump depending on the approaching rates between the target and actual rotational speeds.
Figure 9:
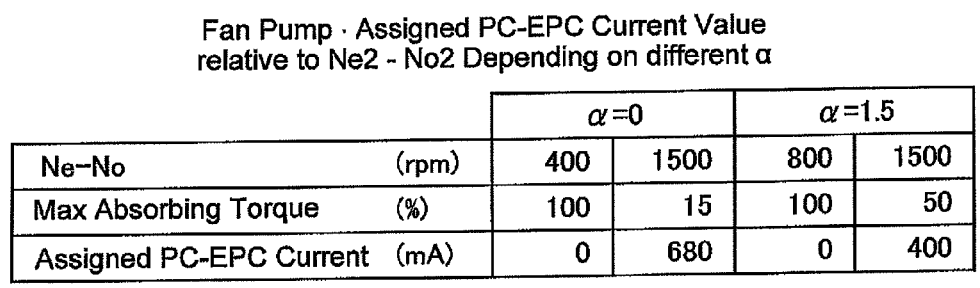

In this embodiment, as shown in FIGS. 8(*a*), 9(*a*) and 10(*a*), the graphs of the steering hydraulic pump 7, the loading hydraulic pump 8 and the fan hydraulic pump 9 are different each showing the relationship between the maximum absorbing torque and the deviation of the rotational speeds.

Figure 10:
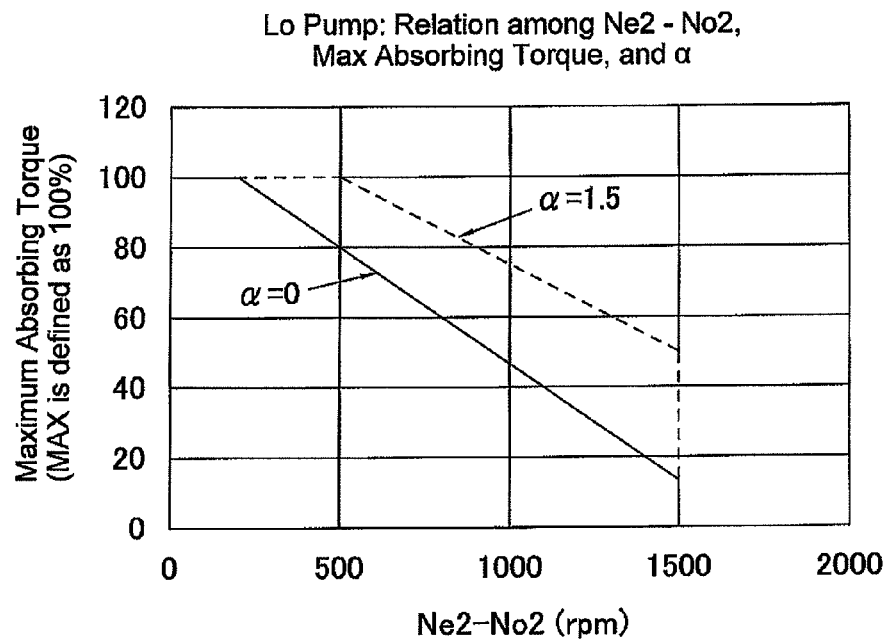
FIG. 10(a) is a graph showing relationship between the maximum absorbing torque of a loading hydraulic pump, and the magnitude of the deviation between the target and actual rotational speeds.
FIG. 10(b) is a table showing relationship between PC-EPC current values and the maximum absorbing torques of the loading hydraulic pump that is used to differently control the maximum absorbing torque of the hydraulic pump depending on the approaching rates between the target and actual rotational speeds.

Specifically, in consideration of higher importance of operation of the steering hydraulic pump 7 than other hydraulic pumps 8 and 9, as shown in FIG. 8(*a*), the reduction range of the maximum absorbing torque in the steering hydraulic pump 7 is smaller than in the cases of the graphs shown in FIGS. 10(*a*) and 9(*a*) corresponding to other hydraulic pumps 8 and 9.

For this reason, for example, even in the situations in which the steering wheel or the control lever for the working unit and the accelerator pedal 17 of the wheel loader 50 are operated substantially at the same time, and the response of the engine 1 gets worse, since the maximum absorbing torque of the loading hydraulic pump 8 or the fan hydraulic pump 9 is controlled to be reduced larger to ensure the discharge amount of the steering hydraulic pump 7, it is possible to prevent the steering response from getting worse.

Linear Interpolation Method at 0<α<1.5

Figure 11:
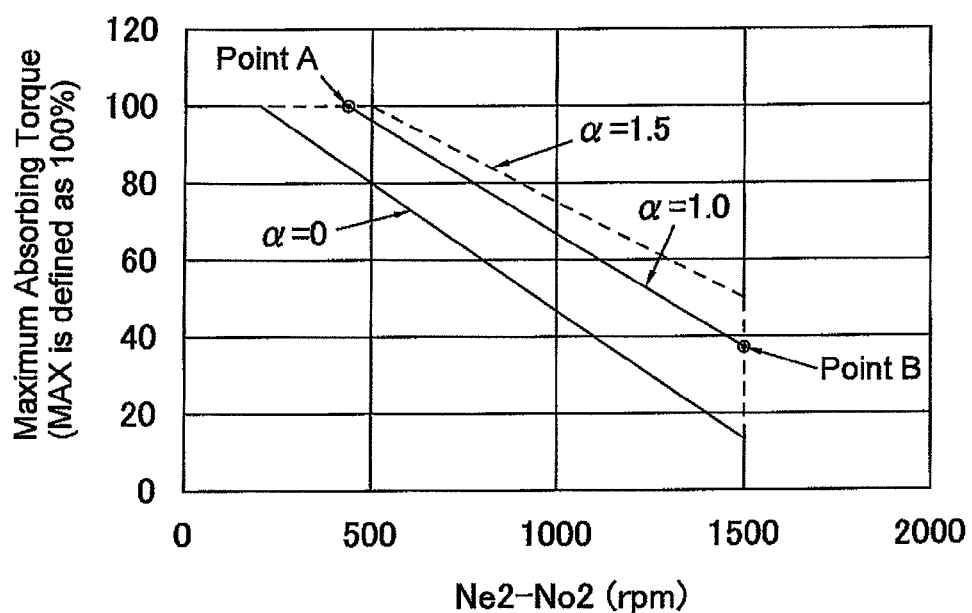
FIG. 11 is a graph showing an interpolation method in the case where the approaching rate $\alpha$ between the target and actual rotational speeds is in the range of $0<\alpha<1.5$.

For purpose of description of the linear interpolation method in the graphs showing the relationship between the deviation of the rotational speeds Ne2-No2, and the maximum absorbing torques of the hydraulic pumps 7 to 9 in the case where the value of the aforementioned approaching rate α is in the range of 0<α<1.5, the following description now describes the linear interpolation method in the loading hydraulic pump 8 in the case of the approaching rate α=1 as an example of the linear interpolation method in the graphs with reference to FIG. 11.

That is, as shown in FIG. 11, in the case of the approaching rate α=1.0, a point A on the graph is first obtained that provides the maximum deviation of the rotational speeds (Ne2-No2) at the maximum absorbing torque Max 100%. The maximum value of the deviation of rotational speeds (Ne2-No2) at the maximum absorbing torque 100% is obtained for a value of the approaching rate α by proportional interpolation between the maximum values of the deviation of rotational speeds (Ne2-No2) at the maximum absorbing torque 100% in the cases of the approaching rate α=0 and the approaching rate α=1.5. The value of the horizontal axis (Ne2-No2) of the point to be obtained can be obtained based on the following calculation.

$$[(500-200)/(1.5-0)] \times 1.0 + 200 = 400$$

Thus, a coordinate (400, 100) can be obtained as the coordinates of the point A.

Subsequently, a value of the maximum absorbing torque is obtained at the deviation of the rotational speeds (Ne2-No2) =1500 rpm in the case of the approaching rate α=1.0. In the case where a point B on the graph shown in FIG. 11 is thus defined, the value of the vertical axis (the maximum absorbing torque) at the coordinates of the point B can be obtained based on the following formula.

$$[(50-15)/(1.5-0)] \times 1.0 + 15 = 38.3$$

Thus, a coordinate (1500, 38.3) can be obtained as the coordinates of the point B.

As a result, a straight line obtained by linear interpolation between the points A and B, is a maximum absorbing torque vs. rotational speed deviation (Ne2-No2) line in the case of approaching rate α=1.0.

It should be appreciated that maximum absorbing torque vs. rotational speed deviation (Ne2-No2) lines can be obtained by the same method in the cases of the steering hydraulic pump 7 and the fan hydraulic pump 9.

Flow of Load Reduction Control of Engine 1

The flow of the aforementioned load reduction control of the engine 1 is now described with reference to FIG. 12.

That is, in Step S1, when the control lever for the working unit and the accelerator pedal 17 are operated substantially at the same time, in Step S2, the controller 18 calculates the deviation between the target and actual rotational speeds Ne and No based on results that are detected by the engine rotational speed sensor 1*a* and the stroke sensor 17*a* of the accelerator pedal 17.

Subsequently, in Step S3, the controller 18 determines whether this deviation is in the range of (Ne2-No2)>200. In this step, if the deviation of the rotational speeds satisfies the aforementioned condition, the sequence goes to Step S4. If the deviation of the rotational speeds does not satisfy the aforementioned condition, the sequence returns to Step S1, and waits until it is detected that the control lever for the working unit and the accelerator pedal 17 are operated substantially at the same time. In this case, the condition of the deviation (Ne2-No2)>200 is used as the start condition of the engine load reduction control that reduces the maximum absorbing torques of the hydraulic pumps 7 to 9. The reason is that, the minimum value of the deviation of the rotational speeds, in the graphs shown in FIGS. 8(*a*) to 10(*b*), that initiates the control for reducing the maximum absorbing torque from 100%, is given by the condition of Ne-No>200 in the loading hydraulic pump 8.

Subsequently, in Step S4, the reduction ranges are assigned according to the magnitude of the deviation of the rotational speeds (Ne-No) to reduce the maximum absorbing torques of the hydraulic pumps 7 to 9.

Subsequently, in Step S5, the approaching rate α per unit time between the target and actual rotational speeds Ne and No of the engine 1 is calculated based on the aforementioned relation formula (1).

Subsequently, in Step S6, it is determined whether the value of the approaching rate α falls within the range of 0<α<1.5. If the value falls within the aforementioned range, the sequence goes to Step S7. If the value does not fall within the aforementioned range, the sequence skips Step S7 and goes straight to Step S8.

In Step S7, the reduction ranges of the maximum absorbing torques of the hydraulic pumps 7 to 9 reassigned to adjusted values according to the magnitude of the approaching rate α.

In Step S8, the reduction control of the maximum absorbing torques of the hydraulic pumps 7 to 9, i.e., the engine load reduction control, is conducted based on the values of the adjusted reduction ranges that are reassigned in Step S7, or the values of the reduction ranges that are assigned in Step S4 if the sequence skips Step S7.

Features of Engine Load Control Device 30

(1) The engine load control device 30 according to this embodiment is installed in the wheel loader 50 that transmits the output of the engine 1 to the hydraulic actuators such as the loading hydraulic cylinder 14 via the variable displacement type hydraulic pumps such as the loading hydraulic pump 8 as shown in FIG. 2. The controller 18 calculates, based on the target and actual rotational speeds Ne and No of the engine 1 that are detected by the engine rotational speed sensor 1a and the stroke sensor 17a, the approaching rate α per unit time, and adjusts the maximum absorbing torques of the hydraulic pumps 7 to 9 according to the magnitude of the approaching rate α as shown in FIG. 7 or the like.

Here, the approaching rate α means that the actual rotational speed No of the engine 1 quickly approaches the target rotational speed Ne in the case where the value of approaching rate α is large, and on the other hand means that the actual rotational speed No of the engine 1 does not quickly approach the target rotational speed Ne in the case where the value of approaching rate α is small.

Accordingly, the variation tendency of previous and current values of the deviation can be recognized by referencing the magnitude of the calculated approaching rate α even in the case where the deviation between the target and actual rotational speeds Ne and No of the engine 1 are the same value. The reduction ranges of the maximum absorbing torques of the hydraulic pumps 7 to 9 that are assigned according to a value of the aforementioned deviation are adjusted to appropriate values, and the output of the engine 1 is appropriately distributed to the engine 1 side and the side for driving the working unit, the steering and the like. Therefore, it is possible to improve the response of the engine 1, and the response to operation of the working unit and the like.

(2) In the engine load control device 30 according to this embodiment, as shown in FIG. 2, the hydraulic pumps 7 to 9 are subject to the control. As shown in FIGS. 8(*a*) to 10(*b*), the reduction of the maximum absorbing torque according to the magnitude of the aforementioned approaching rate α is differently controlled for the hydraulic pumps 7 to 9.

Thus, since the reduction ranges of the maximum absorbing torques of the hydraulic pumps 7 to 9 are assigned in consideration of the importance of the hydraulic pumps 7 to 9 in operation, it is possible to improve the response of the engine 1, and additionally to improve the response of a desired pump among the hydraulic pumps 7 to 9 to improve the workability of the wheel loader 50.

(3) In the engine load control device 30 according to this embodiment, as shown in FIGS. 3, 8(*b*) and the like, when the reduction of the maximum absorbing torques of the hydraulic pumps 7 to 9 is controlled according to the magnitude of the aforementioned approaching rate α, this reduction is controlled by adjustment of the PC-EPC currents that are provided to the PC valves 19 that are connected to the hydraulic pumps 7 to 9.

Thus, since the PC-EPC currents are controlled by the controller 18, it is possible to easily adjust the discharge amounts of the hydraulic pumps 7 to 9 to adjust the reduction ranges of the maximum absorbing torque.

Figure 12:
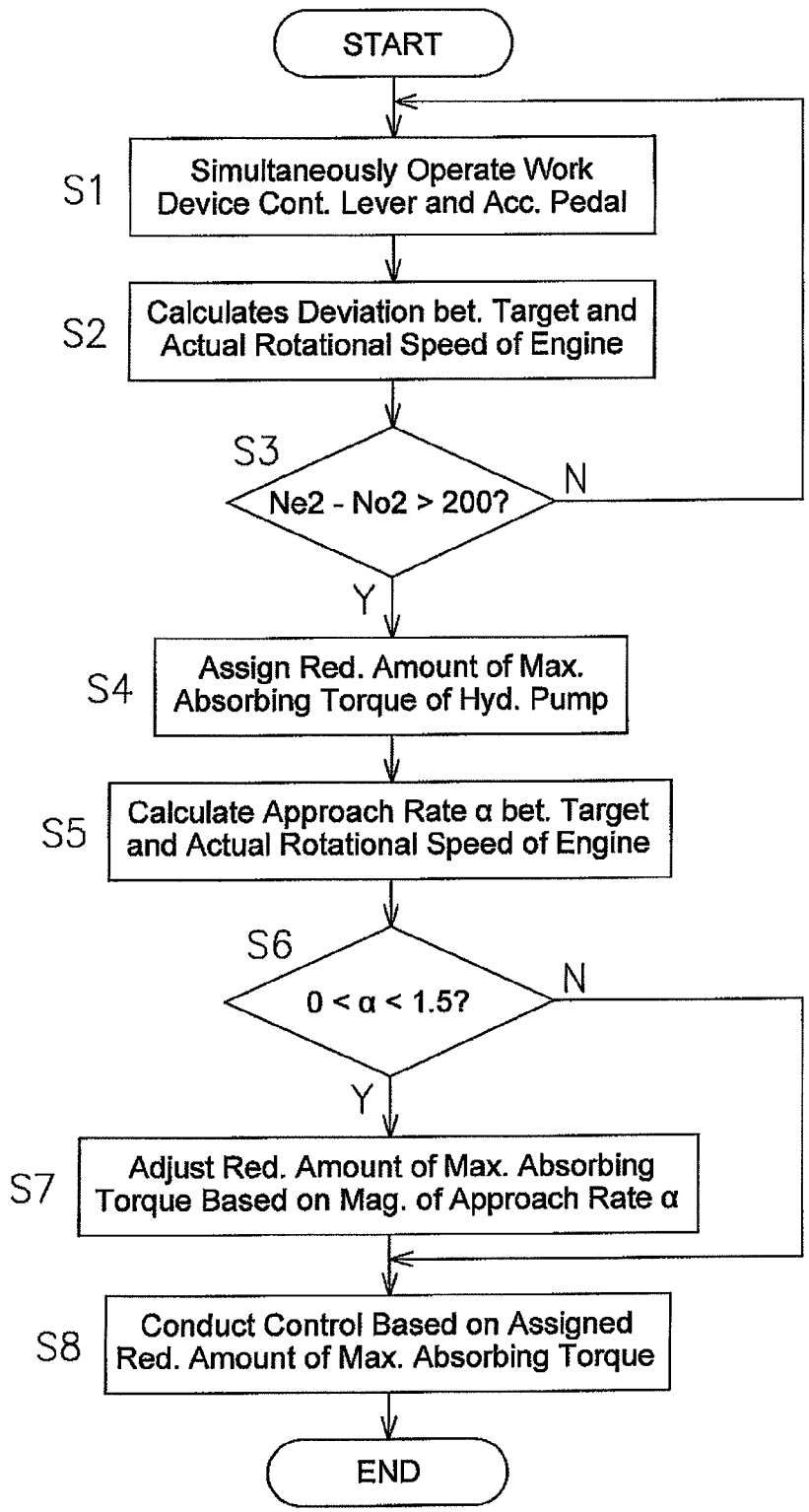
FIG. 12 is a flowchart showing the flow of load reduction control of an engine according to an embodiment of the present invention.

(4) In the engine load control device 30 according to this embodiment, as shown in FIG. 12, when the control lever for the working unit and the accelerator pedal 17 are operated substantially at the same time, the engine load reduction is controlled according to the magnitude of the aforementioned approaching rate α by adjustment of the maximum absorbing torques.

Although the discharge amount of the loading pump 8 is required to increase in response to operation of the control lever for the working unit, the engine load control device waits for sufficient response of the engine 1 and then controls the loading pump 8 so that the discharge amount of the loading pump 8 increases after the actual rotational speed of the engine 1 increases. Therefore, it is possible to improve the response of the engine 1, and additionally to ensure the response to operation of the loading pump 8.

(5) In the engine load control device 30 according to this embodiment, as shown in FIG. 12, if the aforementioned approaching rate α is not less than the predetermined value (α=1.5) in Step S6, Step S7 is skipped that controls the adjustment of the reduction ranges of the maximum absorbing torques of the hydraulic pumps 7 to 9, and the reduction of the maximum absorbing torques is controlled in Step S8.

Thus, in the case where the value of the approaching rate α is not less than the predetermined value, it is expected that the actual rotational speed of the engine 1 immediately reaches the target rotational speed even if the reduction range of the maximum absorbing torque is not adjusted. For this reason, in this case, the adjustment control is not conducted, and the reduction of the maximum absorbing torque can be controlled based on an assigned value that is not adjusted.

(6) In the engine load control device 30 according to this embodiment, as shown in FIG. 2, the stroke sensor 17a that is mounted to the accelerator pedal 17 is used as means for detecting the target rotational speed of the engine 1 that is required to calculate the aforementioned approaching rate α.

Thus, the target rotational speed of the engine 1 can be suitably and accurately detected according to the stroke amount of the accelerator pedal 17. As a result, the aforementioned approaching rate α can be accurately calculated.

Other Embodiments

The foregoing description has described one exemplary embodiment according to the present invention. However, the present invention is not limited to the foregoing embodiment. Various changes and modifications can be made without departing from the gist of the present invention.

(A) In the foregoing embodiment, as shown in FIG. 12, it has been illustratively described that, in the case where the deviation between the target and actual rotational speeds Ne and No of the engine 1 is not less than the predetermined value, and when the approaching rate α per unit time between the target and actual rotational speeds Ne and No falls within the predetermined range, the maximum absorbing torque is controlled to be an optimum maximum absorbing torque according to the magnitude of the approaching rate α. However, the present invention is not limited to this.

Figure 13:
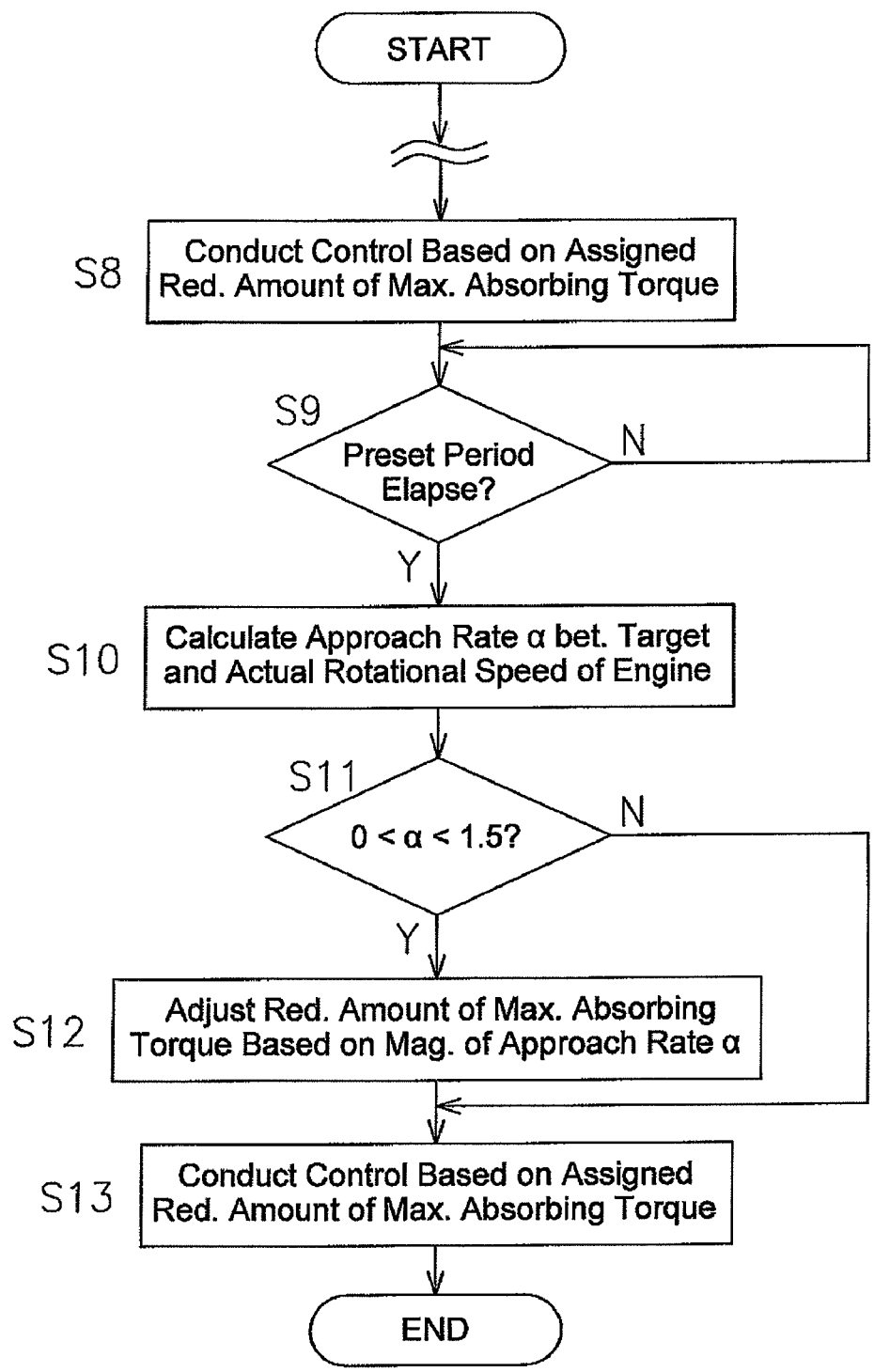
FIG. 13 is a flowchart showing the flow of load reduction control of an engine according to another embodiment of the present invention.

For example, as shown in FIG. 13, after a first approaching rate α is calculated and then the control (Steps S5 to S8) is conducted, processes of Steps S9 to S13 may be added to follow the control.

That is, in Step S9, when a predetermined period of time elapses, in Step S10 the approaching rate α is calculated again. After that, in Steps S11 to S13, control similar to Steps S6 to S8 is conducted to adjust the reduction range of the maximum absorbing torque again.

In this embodiment, for example, in the case where after the control starts the control lever for the working unit, the steering wheel or the like is operated more widely, if the engine 1 takes time to provide sufficient response, the approaching rate α is calculated again. Accordingly, it is possible to adjust the reduction range of the maximum absorbing torque again according to the magnitude of this α. Therefore, it is possible to provide an engine load control device that can respond to engine load increase even after the control starts.

(B) In the foregoing embodiment, as shown in FIG. 12, it has been illustratively described that, in the case where the deviation between the target and actual rotational speeds of the engine 1 is larger than the predetermined value (e.g., 200 rpm in the case of the loading hydraulic pump 8), and the approaching rate α that indicates the variation rate of the deviation per unit time falls within the range of $0<\alpha<1.5$, in each of the hydraulic pumps 7 to 9, the reduction range of the maximum absorbing torque is controlled to increase greater (the reduction range is reduced) than the reduction range in the case of α=0 as the reference. However, the present invention is not limited to this.

For example, in the case where the approaching rate α=0.5 is assigned as the reference of the adjustment control of the reduction range, if the approaching rate α falls within the range of $0<\alpha<0.5$, the maximum absorbing torque of the hydraulic pump may be controlled lower than the reduction range as the reference. In other words, to create a line in this case that is deviated downward from the line in the graph in the case of the reference, the reduction range of the maximum absorbing torque may be further increased. In this embodiment, it is possible for the engine actual rotational speed to more quickly approach to the target rotational speed as compared with the general case.

(C) In the foregoing embodiment, as shown in FIGS. 8(a) to 10(b), the wheel loader 50 has been illustratively described that includes three hydraulic pumps (steering, fan, and loading hydraulic pumps) 7 to 9 as the hydraulic pumps that are subject to the control that adjusts their maximum absorbing torques. However, the present invention is not limited to this.

For example, the present invention is applicable to work vehicles such as a wheel loader that includes only one hydraulic pump for a working unit, or four or more hydraulic pumps.

Note that even in the case where a work vehicle includes a plurality of hydraulic pumps similarly to the foregoing embodiment, the number of hydraulic pumps that are subject to the control may be limited to one or two, and the maximum absorbing torque may be controlled.

(D) In the foregoing embodiment, as shown in FIGS. 8(a) to 10(b), it has been illustratively described that, the control for adjusting the maximum absorbing torques in the hydraulic pumps 7 to 9, is conducted when the values of the deviation between the rotational speeds is not less than 600 rpm for the steering hydraulic pump 7, 400 rpm for the fan hydraulic pump 9, and 200 rpm for the loading hydraulic pump 8, respectively, for example, by assigning the different threshold values for the deviation between the rotational speeds of each of the hydraulic pumps 7 to 9 to adjust the maximum absorbing torques. However, the present invention is not limited to this.

For example, the hydraulic pumps may be assigned a common threshold value of the deviation between the rotational speeds, which is not less than 500 rpm as a control condition.

However, in the case where, in consideration of the importance of each of the hydraulic pumps, the control that suppresses the maximum absorbing torque is conducted later in decreasing order of importance of the hydraulic pumps in operation (for example, a particularly important pump is the steering hydraulic pump 7), the operativity of the work vehicle can be ensured, and the engine response is improved. From this viewpoint, it is preferable that the hydraulic pumps are assigned different threshold values, and differently controlled similarly to the foregoing embodiment.

(E) In the foregoing embodiment, as shown in FIG. 12, it has been illustratively described that the accelerator pedal 17 and the control lever for the working unit are operated substantially at the same time. However, the present invention is not limited to this.

For example, when the control lever for the working unit is quickly operated, even in the case where the accelerator pedal is depressed at delayed timing, the engine output to the hydraulic pump side may also be distributed to the side that the engine rotational speed increases. In this embodiment, it is possible to achieve an effect that improves the response of the engine at the beginning of the depression, similar to the foregoing embodiment.

A subject to be controlled together with the accelerator pedal substantially at the same time is not limited to the control lever for the working unit. For example, when the steering wheel is operated, or when the steering wheel and the control lever for the working unit are operated, the present invention may be similarly applied.

(F) In the foregoing embodiment, as shown in FIG. 2, it has been illustratively described that the target rotational speed of the engine 1 is detected based on the stroke amount of the accelerator pedal 17 that is detected by the stroke sensor 17a. However, the present invention is not limited to this.

For example, the present invention may be similarly applied to controls that can direct the rotational speed based on operator's intention such as an accelerator control lever.

(G) In the foregoing embodiment, as shown in FIGS. 3, 8(b) and the like, it has been illustratively described that the PC-EPC currents that adjust the discharge amounts of the hydraulic pumps 7 to 9 are controlled to control the maximum absorbing torques of the hydraulic pumps 7 to 9. However, the present invention is not limited to this.

For example, methods other than the adjustment of PC-EPC current may be used to adjust the maximum absorbing torque of each hydraulic pump.

(H) In the foregoing embodiment, as shown in FIG. 1, the wheel loader 50 has been illustratively described that includes the controller 18 as the engine load control device according to the present invention. However, the present invention is not limited to this.

For example, the present invention may be applied to other construction machines such as a hydraulic excavator and a hydraulic crane.

Since an engine load control device of a work vehicle according to the illustrated embodiment provides an effect that an engine load (absorbing torque of a pump) can be effectively adjusted based on the tendency of the variation of the deviation between a target rotational speed and an actual rotational speed of an engine, the engine load control device of a work vehicle can be widely applied to various types of work vehicles that drive a hydraulic pump by using the output of an engine.

The invention claimed is:

1. An engine load control device of a work vehicle in which an output of an engine is transmitted to driving wheels and is transmitted via a variable displacement type hydraulic pump to a hydraulic actuator, the engine load control device of a work vehicle comprising:
 a target rotational speed detecting portion configured to detect a target rotational speed of the engine based on a command from a rotational speed directing device configured to control a rotational speed of the engine;
 an actual rotational speed detecting portion configured to detect an actual rotational speed of the engine;
 a control portion configured to reduce maximum absorbing torque of the variable displacement type hydraulic pump according to a difference between the target rotational speed of the engine and the actual rotational speed of tile engine; and
 a variation rate calculating portion configured to calculate a variation rate indicative of a variation amount per unit time of the difference between the target rotational speed of the engine and the actual rotational speed of the engine,
 the control portion being further configured to adjust a reduction range of the maximum absorbing torque of the variable displacement type hydraulic pump according to a magnitude of the variation rate calculated by the variation rate calculating portion such that the larger the variation rate is, the smaller the reduction range is,
 the control portion is configured to calculate the variation rate each time a predetermined period of time elapses; and,
 when the variation rate is not less than a predetermined threshold value, the control portion is configured not to perform adjustment of the maximum absorbing torque of the variable displacement type hydraulic pump.

2. The engine load control device of a work vehicle according to claim 1, wherein
 the control portion is configured to control a plurality of variable displacement type hydraulic pumps each provided with a corresponding hydraulic actuator to change a value of the reduction range of maximum absorbing torque of each of the variable displacement type hydraulic pumps according to the variation rate.

3. The engine load control device of a work vehicle according to claim 1, wherein
 the control portion is configured to control an EPC current that controls a discharge amount of the variable displacement type hydraulic pump so that the reduction range of the maximum absorbing torque of the variable displacement type hydraulic pump is adjusted.

4. The engine load control device of a work vehicle according to claim 1, wherein
 when detecting that input to the rotational speed directing device and input of an operation command to the hydraulic actuator are conducted substantially at the same time, the control portion is configured to adjust the reduction range of the maximum absorbing torque of the variable displacement type hydraulic pump.

5. The engine load control device of a work vehicle according to claim 1, wherein
 the target rotational speed detecting portion is configured to detect the target rotational speed of the engine based on the command from an accelerator pedal that adjusts the rotational speed of the engine as the rotational speed directing device.

6. The engine load control device of a work vehicle according to claim 2, wherein
 the control portion is configured to control an EPC current that controls a discharge amount of the variable displacement type hydraulic pump so that the reduction range of the maximum absorbing torque of the variable displacement type hydraulic pump is adjusted.

7. The engine load control device of a work vehicle according to claim 2, wherein
 when detecting that input to the rotational speed directing device and input of an operation command to the hydraulic actuator are conducted substantially at the same time, the control portion is configured to adjust the reduction range of the maximum absorbing torque of the variable displacement type hydraulic pump.

8. The engine load control device of a work vehicle according to claim 2, wherein
 the control portion is configured to calculate the variation rate each time a predetermined period of time elapses.

9. The engine load control device of a work vehicle according to claim 2, wherein
 when the variation rate is not less than a predetermined threshold value, the control portion is configured hot to perform adjustment of the maximum absorbing torque of the variable displacement type hydraulic pump.

10. The engine load control device of a work vehicle according to claim 2, wherein
 the target rotational speed detecting portion is configured to detect the target rotational speed of the engine based on the command from an accelerator pedal that adjusts the rotational speed of the engine as the rotational speed directing device.

* * * * *